United States Patent
Iyer et al.

(10) Patent No.: US 6,430,928 B1
(45) Date of Patent: Aug. 13, 2002

(54) DUAL ACTION DAMPER FOR HYDRAULIC CLUTCH ACTUATOR

(75) Inventors: Rajiv Iyer, Auburn Hills; Michael James Woodard, Utica, both of MI (US); Benjamin Chetwood Struve, Leamington Spa (GB); Richard A. Nix, Ortonville, MI (US)

(73) Assignee: Automotive Products (USA), Inc.

( * ) Notice: Subject to any disclaimer, the term of this patent is extended or adjusted under 35 U.S.C. 154(b) by 0 days.

(21) Appl. No.: 09/620,436

(22) Filed: Jul. 20, 2000

(51) Int. Cl.$^7$ .............................................. H15B 7/10
(52) U.S. Cl. ....................................................... 60/592
(58) Field of Search ........................... 60/592, 533, 469

(56) References Cited

U.S. PATENT DOCUMENTS

| | | | |
|---|---|---|---|
| 3,090,201 A | * 5/1963 | May ............................. | 60/592 |
| 4,166,655 A | 9/1979 | Spero | |
| 4,188,073 A | 2/1980 | Ishikawa et al. | |
| 4,301,908 A | 11/1981 | Fukuda et al. | |
| 4,427,029 A | 1/1984 | Charney et al. | |
| 4,599,860 A | * 7/1986 | Parsons ........................ | 60/584 |
| 4,629,562 A | 12/1986 | Kercher | |
| 4,779,625 A | 10/1988 | Cole | |
| 4,986,404 A | 1/1991 | Kajitani et al. | |
| 4,998,609 A | 3/1991 | Nix et al. | |
| 5,020,864 A | 6/1991 | Tanaka | |
| 5,031,969 A | 7/1991 | Siegel | |
| 5,058,961 A | 10/1991 | Mergenthaler et al. | |
| 5,070,983 A | 12/1991 | Leigh-Monstevens et al. | |
| 5,320,203 A | 6/1994 | Wilber et al. | |
| 6,148,614 A | * 11/2000 | Nix et al. ...................... | 60/592 |

FOREIGN PATENT DOCUMENTS

| | | | | |
|---|---|---|---|---|
| DE | 38 70 954 A | | 9/1998 | |
| EP | 0491159 A1 | * | 11/1991 | ........... F16L/55/04 |
| FR | 2 451 536 | | 10/1980 | |
| FR | 2 596 711 | | 9/1987 | |
| FR | 2 611 023 | | 8/1988 | |
| FR | 2655128 A | * | 5/1991 | ........... F16L/55/04 |
| GB | 996 841 | | 6/1965 | |
| GB | 1 089 667 | | 11/1967 | |
| GB | 1 562 709 | | 3/1980 | |
| GB | 2 058 272 A | | 4/1981 | |
| GB | 2139702 A | * | 4/1984 | ........... F16L/55/04 |
| GB | 2 139 709 A | | 11/1984 | |
| GB | 1089667 | * | 2/1994 | .................. 60/592 |
| JP | 54-3731 | | 12/1979 | |
| JP | 55-72421 | | 5/1980 | |
| JP | 59-50232 | | 3/1984 | |
| JP | 59-89833 | | 5/1984 | |
| JP | 59-89834 | | 5/1984 | |
| JP | 07293588 | * | 6/1994 | ........... F16L/55/04 |

* cited by examiner

Primary Examiner—Edward K. Look
Assistant Examiner—Igor Kershteyn
(74) Attorney, Agent, or Firm—Young & Basile

(57) ABSTRACT

A clutch hydraulic actuator system having a vibration damper provided in the system between a master cylinder and a slave cylinder of the system. The damper includes an elastomeric diaphragm and a spring steel diaphragm. One face of the elastomeric diaphragm is in fluid communication with hydraulic fluid in the system so that the elastomeric diaphragm may deflect in response to low frequency vibrations transmitted through hydraulic fluid in the system to effect damping of the low frequency vibrations. The spring steel diaphragm is positioned in the system generally parallel to and proximate the other face of the elastomeric diaphragm so as to form a backup for the elastomeric diaphragm so that the elastomeric diaphragm may deform against the spring steel diaphragm in response to high frequency vibrations transmitted through the hydraulic fluid to cause deflection of the spring steel diaphragm to effect damping of the high frequency vibrations.

20 Claims, 7 Drawing Sheets

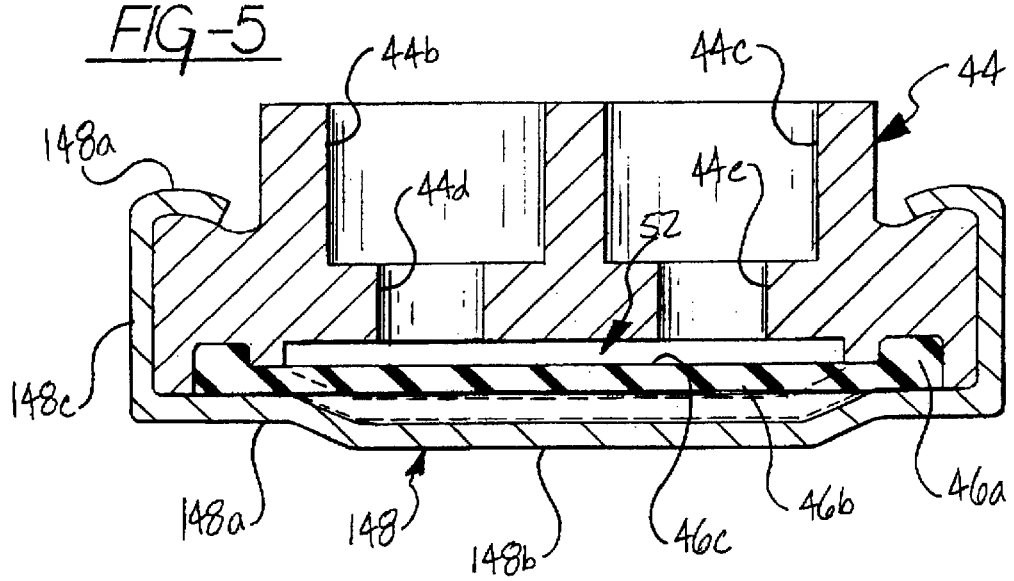
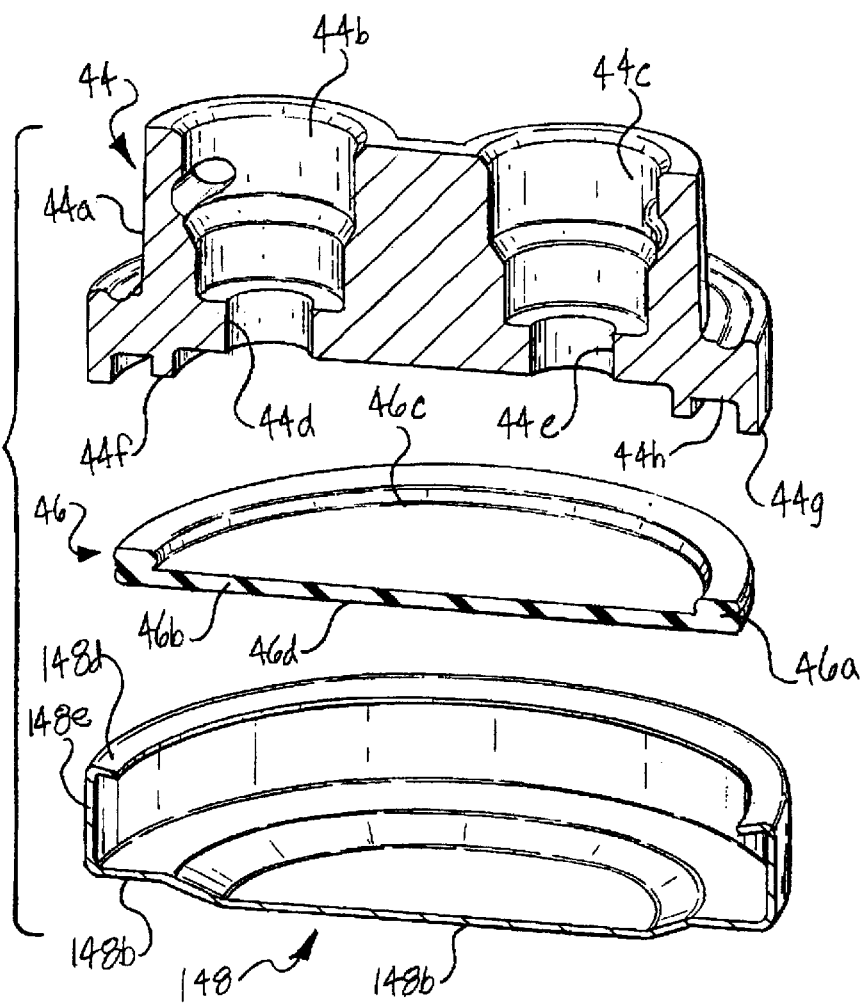

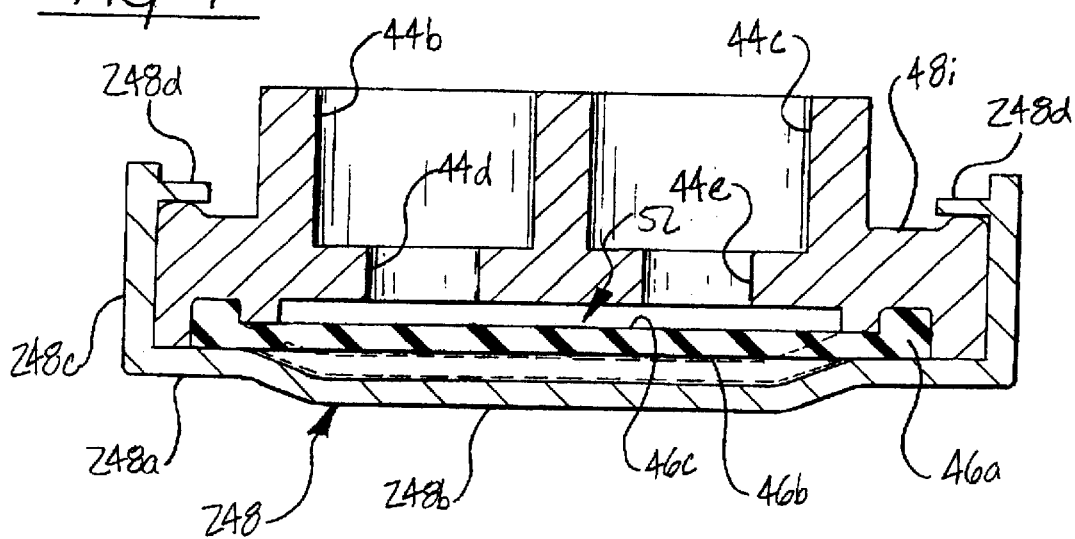
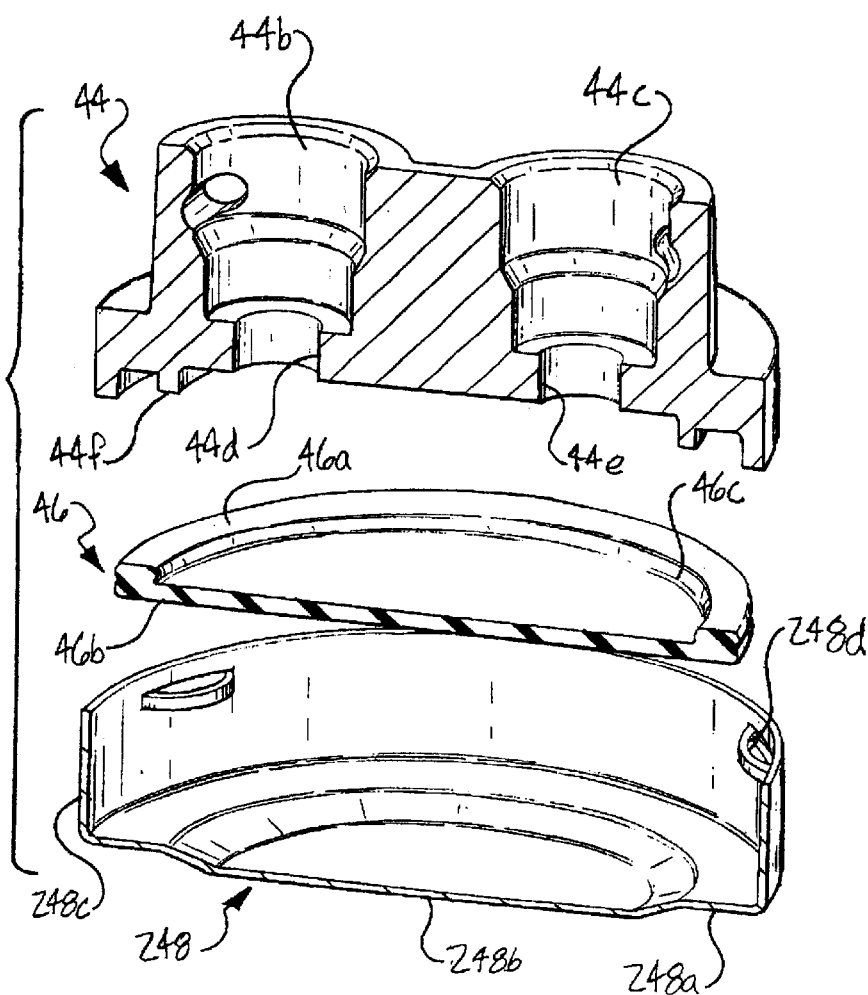

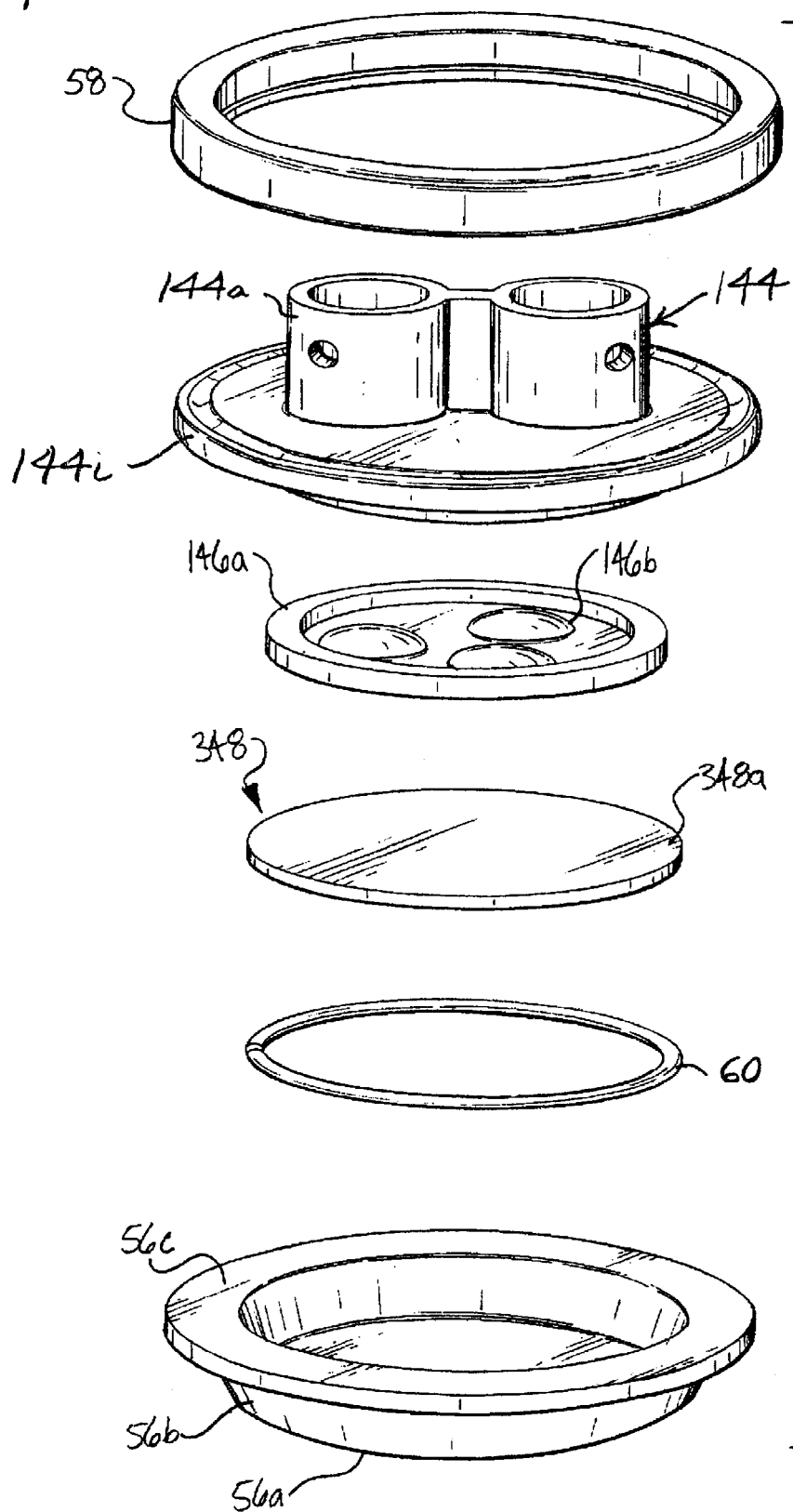

DUAL ACTION DAMPER FOR HYDRAULIC CLUTCH ACTUATOR

BACKGROUND OF THE INVENTION

This invention relates to hydraulic clutch actuators and more particularly to hydraulic clutch actuators employing a damper mechanism.

Hydraulic actuators are known for operating a mechanism at a remote location by way of a master cylinder connected to a slave cylinder installed at the remote location. A conduit interconnects the master cylinder to the slave cylinder and the hydraulic apparatus is filled with hydraulic fluid such that, when the piston of the master cylinder is actuated, the piston of the slave cylinder and consequently the piston rod or output member is simultaneously actuated by displacement of the hydraulic fluid from the master cylinder to the slave cylinder through the conduit.

More particularly, it is known to provide such a hydraulic actuator for operating the clutch of a motor vehicle so that, when the clutch pedal of the vehicle is depressed by the driver, the slave cylinder is actuated to operate the clutch in known manner. Preferably, as described in U.S. Pat. No. 4,599,860 assigned to the assignee of the present application, the clutch actuator is provided to the motor vehicle manufacturer in an assembled pre-filled form to simplify installation of the actuator on the vehicle, avoid the inconvenience of potential spillage of hydraulic fluid during on-line filling, eliminate the necessity to bleed or purge the lines of the actuator to facilitate the filling process, and eliminate the need to test the actuator after installation and filling. Whereas hydraulic clutch actuators, and particularly pre-filled clutch actuators, have enjoyed significant commercial success, they have the ability to transmit vibrations backwardly through the system from the clutch to the clutch pedal with the result that the operator may experience unpleasant vibrations at the clutch pedal.

Specifically, imbalances in the crank shaft of the vehicle engine or engine firing impulses are transmitted to the flywheel which undergoes a swashing movement, the flywheel swashing movement in turn leads to vibrations of the spring fingers of the clutch release mechanism, the vibrations of the spring fingers are transferred to the release bearing of the clutch, and the vibrations propagate backwardly through the hydraulic fluid in the slave cylinder, through the hydraulic fluid in the conduit interconnecting the slave cylinder and the master cylinder, through the hydraulic fluid in the master cylinder, and then through the master cylinder pushrod to the clutch pedal where they are experienced by the operator as vibrations of the clutch pedal. The propagated vibrations also generate a pedal growl which is audible to the operator as well as a clutch roar which may also be audible to the operator.

Various devices have been proposed in an attempt to attenuate these vibrations, for example, tuned masses have been attached to various parts of the clutch system including the clutch release lever, the slave cylinder pushrod, and the clutch pedal. Rubber dampers have also been employed in the master cylinder pushrod, rubber hose sections have been employed in the conduit interconnecting the master cylinder and the slave cylinder, and various damper devices have been proposed for installation in the interconnecting conduit. In particular, a damper device as shown in British Patent Specification 1,562,709 or as shown in U.S. Pat. Nos. 4,998,609 or 5,320,203, all assigned to the assignee of the present invention, may be installed in the conduit interconnecting the master cylinder and the slave cylinder.

Whereas these prior art devices have been successful in varying degrees in attenuating the vibrations in the system, they are dedicated to attenuating vibrations in a predetermined frequency range and accordingly are ineffective in attenuating vibrations falling outside of the predetermined range. Specifically, damping devices that are effective in attenuating the high frequency vibrations occurring in the system during engagement and disengagement of the clutch during normal driving are generally ineffective in attenuating the low frequency vibrations appearing at the clutch pedal during engine idle conditions with the transmission in neutral.

SUMMARY OF THE INVENTION

This invention is directed to the provision of an improved damper device for use in association with a hydraulic clutch actuator.

More particularly, this invention is directed to the provision of an improved damper device for use in association with a hydraulic clutch actuator which effectively attenuates both high frequency and low frequency vibrations in the system.

This invention relates to a damper for provision in a hydraulic actuator system between a master cylinder and a slave cylinder of the system. The damper includes a housing including port means for connection in the system and defining a chamber in communication with the port means, and diaphragm means carried by the housing and extending across the chamber so as to form a boundary wall of the system so that the diaphragm means may deflect in response to vibrations transmitted through the hydraulic fluid in the system to effect damping of the vibrations.

According to the invention, the damping means is a compound structure including an elastomeric diaphragm extending across the chamber with one face thereof communicating with the port means so as to form the system boundary wall so that the elastomeric diaphragm may deflect in response to low frequency vibrations transmitted through hydraulic fluid in the system to effect damping of the low frequency vibrations, and a further diaphragm positioned parallel to and proximate the other face of the elastomeric diaphragm so as to form a backup for the elastomeric diaphragm so that the elastomeric diaphragm may deform against the further diaphragm in response to high frequency vibrations transmitted through the hydraulic fluid to cause deflection of the further diaphragm to effect damping of the high frequency vibrations. This arrangement allows the damper to effectively attenuate both low frequency and high frequency vibrations encountered in the associated hydraulic system.

According to a further feature of the invention, the elastomeric diaphragm is a rubber diaphragm and the further diaphragm is a spring steel diaphragm. This particular combination of diaphragm materials allows the elastomeric diaphragm to deform elastically against and into conformity with the spring steel diaphragm whereafter the spring steel diaphragm may deflect to absorb high frequency vibrations.

In one embodiment of the invention, the spring steel diaphragm has a dished configuration including a peripheral portion engaging a peripheral portion of the confronting face of the elastomeric diaphragm and a central recessed portion positioned proximate but spaced from a central portion of the other face of the elastomeric diaphragm. With this arrangement the elastomeric diaphragm may deform downwardly elastically into conformity with the recessed portion of the stainless steel diaphragm whereafter the stainless steel diaphragm may deflect to absorb high frequency vibrations.

In a further embodiment of the invention, the elastomeric diaphragm includes a generally planar main body portion positioned against one face of the stainless steel diaphragm and a plurality of spaced bubble portions upstanding from the main body portion of the elastomeric diaphragm and defining void areas therebeneath between the elastomeric diaphragm and the stainless steel diaphragm. With this arrangement the bubbles may elastically flatten to absorb low frequency vibrations whereafter, following flattening of the bubbles against the underlying stainless steel diaphragm, the stainless steel diaphragm may deflect to absorb high frequency vibrations.

The invention also contemplates a method of damping vibrations in a hydraulic actuator system of the type including a master cylinder and a slave cylinder. According to the invention methodology, an elastomeric diaphragm is positioned in the system between the master cylinder and the slave cylinder with one face of the elastomeric diaphragm in fluid communication with hydraulic fluid in the system, whereby the elastomeric diaphragm may deflect in response to low frequency vibrations transmitted through the hydraulic fluid in the system to effect damping of the low frequency vibrations, and a further diaphragm is positioned in the system generally parallel to and proximate the other face of the elastomeric diaphragm so as to form a backup for the elastomeric diaphragm so that the elastomeric diaphragm may deform against the further diaphragm in response to high frequency vibrations transmitted through the hydraulic fluid to cause deflection of the further diaphragm to effect damping of the high frequency vibrations. This methodology allows the damper to act to effectively dampen both low frequency and high frequency vibrations occurring in the hydraulic system.

Other objects, advantages and applications of the present invention will become apparent to those skilled in the art when the following description of the best modes contemplated for practicing the invention are read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 5 is a cross-sectional view of a modified damper design;

FIG. 6 is a fragmentary exploded view of the damper of FIG. 5;

FIG. 7 is a cross-sectional view of a further modified damper design;

FIG. 8 is a fragmentary exploded view of the damper of FIG. 7;

FIG. 10 is a fragmentary exploded view of the damper of FIG. 9; and

DESCRIPTION OF THE PREFERRED EMBODIMENTS

Figure 1:
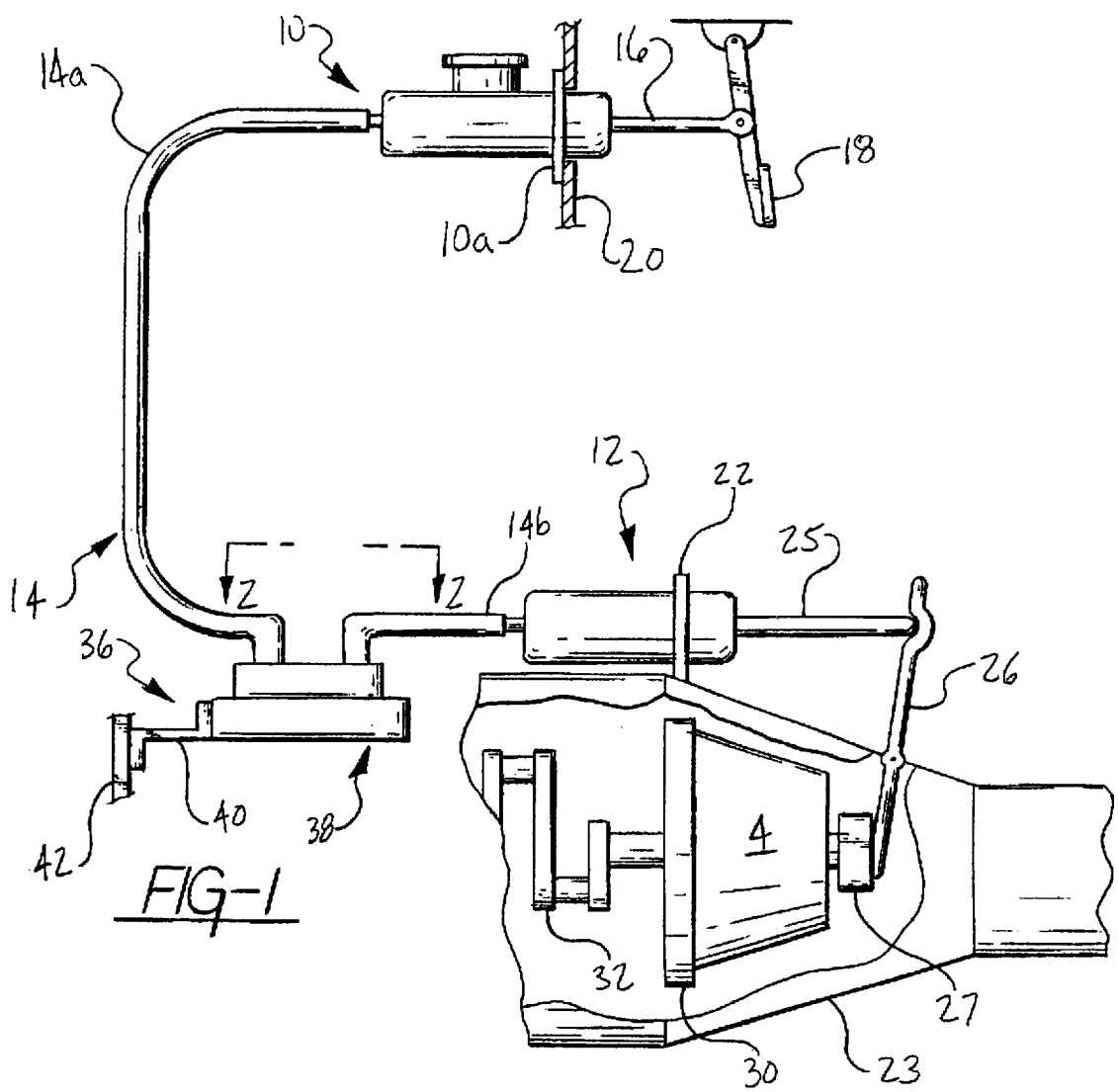
FIG. 1 is a somewhat schematic view of a hydraulic clutch actuator employing the invention damper.

The hydraulic clutch actuator shown schematically in FIG. 1 includes a master cylinder 10, a slave cylinder 12, and a conduit 14 extending between the outlet or discharge of the master cylinder and the inlet of the slave cylinder.

Master cylinder 10 includes an input rod 16 connected in known manner to the clutch pedal 18 of an associated motor vehicle so that pivotal movement of the clutch pedal by the vehicle operator moves a piston of the master cylinder in known manner to discharge pressure fluid from the cylinder. Cylinder 10 further includes a flange 10a to facilitate attachment of the master cylinder to the firewall 20 of the vehicle.

Slave cylinder 12 is secured as by a bracket 22 to the bell housing 23 enclosing the clutch 24 of the vehicle and includes an output rod 25 coacting in known manner with a clutch release lever 26 so that pivotal movement of clutch pedal 18 by the operator results in discharge or pressure fluid from master cylinder 10 for conveyance through conduit 14 to slave cylinder 12 to provide extension of output rod 25 and pivotal movement of release lever 26 to move the clutch release bearing 27 in a direction to disengage the clutch 24. Clutch 24 is driven in known manner by a flywheel 30 which in turn is driven by an engine crank shaft 32. The invention damper assembly 36 is interposed in conduit 14 and is connected to the outlet of master cylinder 10 by a conduit portion 14a and to the inlet of slave cylinder 12 by a conduit portion 14b.

Damper assembly 36 includes (FIGS. 2, 3, and 4) a damper 38 and a bracket 40 to facilitate attachment of damper 38 to a fixed vehicle panel 42. Damper 38 includes a housing 44, a relatively flexible elastomeric diaphragm 46, a relatively stiff metallic diaphragm 48, and a clamping ring 50.

Housing 44 has a generally circular configuration and is formed of a suitable metallic material. Housing 44 includes a main body portion 44a, an inlet fitting 44b, an outlet fitting 44c, an inlet port 44d communicating with inlet fitting 44b, an outlet port 44e communicating with outlet fitting 44c, an annular rib 44f, and an annular flange or skirt 44g coacting with rib 44f to define an annular groove 44h. Conduit portion 14a is suitably received in inlet fitting 44b and conduit portion 14b is suitably received in outlet fitting 44c.

Elastomeric diaphragm 46 has a generally circular planar configuration and is formed of a suitable elastic material such as rubber. Diaphragm 46 includes an upstanding outer flange portion 46a sized to fit in groove 44h and a generally planar central main body portion 46b extending beneath ports 44d, 44e to define a chamber 52 in communication with the ports. Diaphragm 46 will be seen to have a thin planar configuration including upper and lower parallel faces 46c and 46d. The upper face 46c of the diaphragm will be seen to form a boundary wall of the hydraulic actuator system so that the diaphragm may deflect in response to vibrations transmitted through the hydraulic fluid in the system.

Diaphragm 48 has a generally circular dished configuration and is preferably formed of spring steel. Diaphragm 48 includes a peripheral portion 48a engaging a peripheral portion of the lower face 46d of the elastomeric diaphragm and a central recessed or dished portion 48b defining an upper face positioned proximate but spaced below a central portion of the lower face 46d of the elastomeric diaphragm to define a void 54.

Clamping ring 50 has a generally circular configuration and includes an upper flange portion 50a clampingly engaging a shoulder 44i on housing main body portion 48a and a lower flange portion 50b clampingly engaging the underside of the peripheral portion 48a of spring steel diaphragm 48. Clamping ring 50 will be seen to press the diaphragm 48 upwardly against diaphragm 46 and into engagement with housing flange portion 44g whereby to press flange portion 46a of elastomeric diaphragm 46 firmly into groove 44h.

In operation, low frequency vibrations (for example, 0–10 hertz) transmitted through the hydraulic fluid in the system to the damper have the effect of deflecting the elastomeric diaphragm 46 to effect damping of the low frequency vibrations. This damping action of the elastomeric diaphragm with respect to the low frequency vibrations has no effect on spring steel damper 48. However, in response to high frequency vibrations (for example, more than 20 hertz) transmitted through the hydraulic fluid to the damper, the stainless steel diaphragm forms a backup for the elastomeric diaphragm and, specifically, the elastomeric diaphragm 46 elastically deforms against the spring steel diaphragm 48 to seat the lower face 46d of the elastomeric diaphragm against the upper face of the diaphragm 48 and cause deflection of the spring steel diaphragm whereby to effect damping of the high frequency vibrations. The deformed position of the elastomeric diaphragm against the spring steel diaphragm to bring the spring steel into action is seen in dash lines in FIG. 3.

The invention damper is thus effective to dampen the low frequency vibrations typically appearing at the clutch pedal during engine idle conditions with the transmission in neutral as well as the high frequency vibrations appearing in the system during engagement and disengagement of the clutch during normal driving. The damper of the invention thus has the dual effect of dampening not only the low frequency vibrations encountered at idle in the system but also the high frequency vibrations encountered during normal driving conditions.

Figure 3:
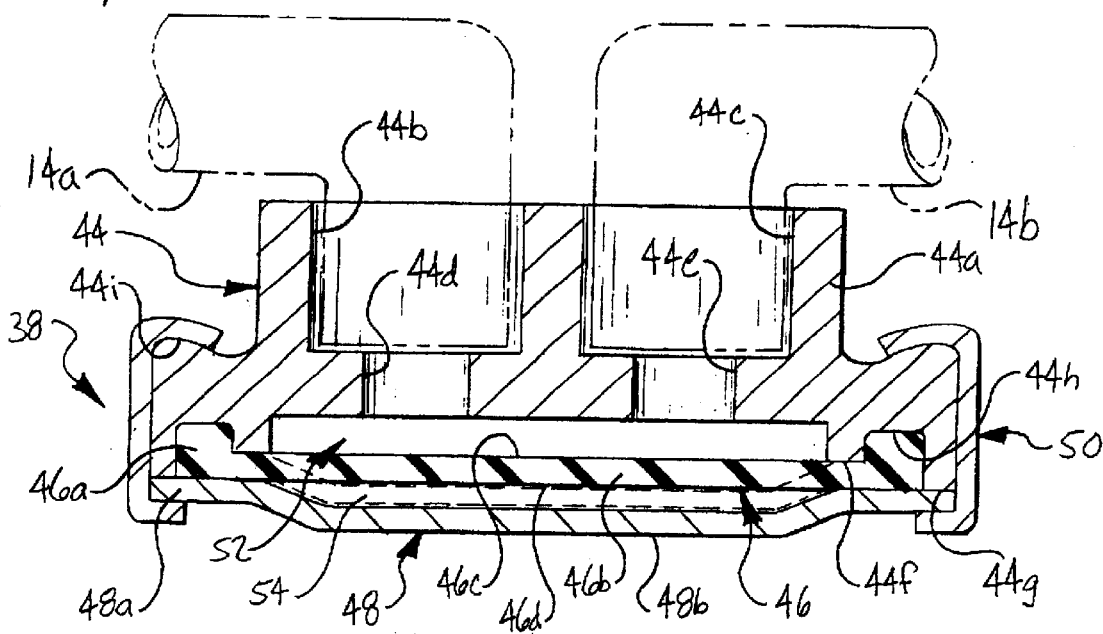
FIG. 3 is a cross-sectional view taken on line 3—3 of FIG. 2.
Figure 4:
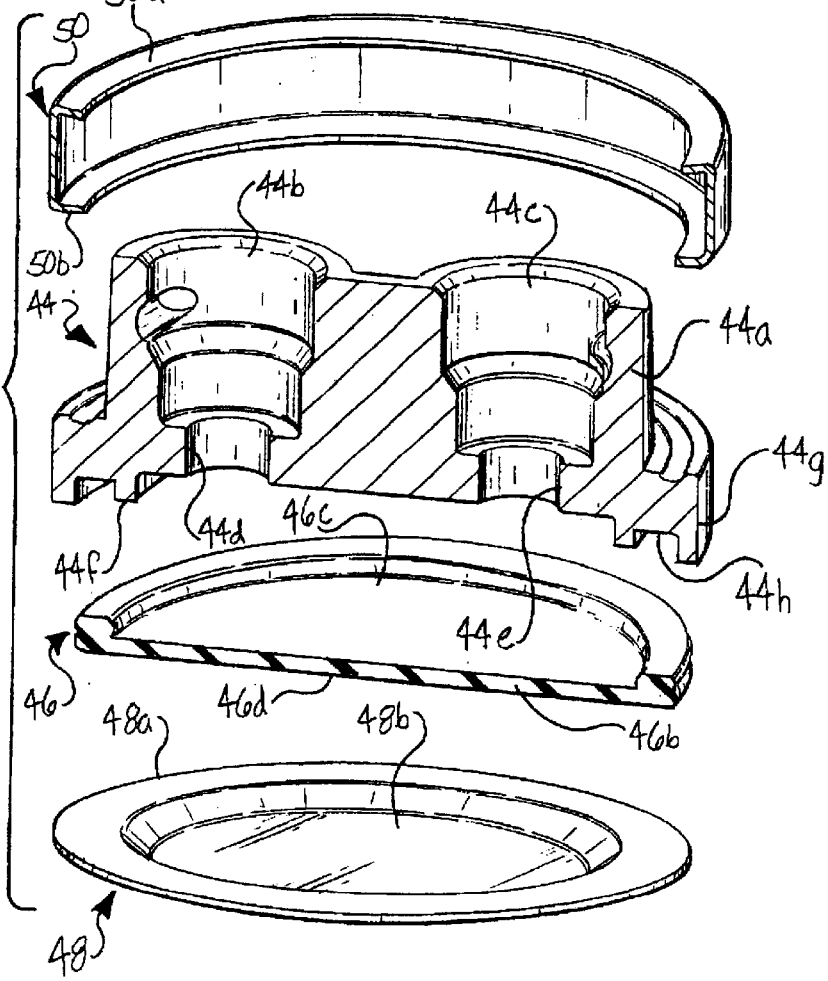
FIG. 4 is an exploded fragmentary view of the damper of FIG. 3.

The modified damper seen in FIGS. 5 and 6 is generally similar to the damper of FIGS. 3 and 4 with the exception that the spring steel damper 146 now includes an upstanding annular flange portion 148c which replaces the clamping ring 50 in the FIG. 3–4 embodiment. Specifically, in the assembled relation of the damper of FIGS. 5–6, the annular flange portion 148c of the spring steel diaphragm embraces the outer periphery of the main body portion 44a of the housing with the upper annular edge 148d of the flange portion rolled over to engage the shoulder 44i of the housing and firmly clamp the spring steel diaphragm and the elastomeric diaphragm in place with respect to the housing. As with the embodiment of FIGS. 3–4, elastomeric diaphragm 46 is effective to absorb the low frequency vibrations without disturbing or involving the spring steel diaphragm but deforms elastically against the backup spring steel diaphragm in response to high frequency vibrations whereby to allow the spring steel diaphragm to effectively attenuate the high frequency vibrations.

The damper embodiment seen in FIGS. 7 and 8 is generally similar to the embodiment of FIGS. 5 and 6 with the exception that the rolled lip 148d of the annular flange portion of the FIGS. 5 and 6 steel diaphragm is functionally replaced with a plurality of circumferentially spaced finger portions 248d struck inwardly from the upper region of the wall of flange portion 248c for coaction with the shoulder 44i of the housing 44 to fixedly secure the spring steel diaphragm and the elastomeric diaphragm to the housing. The damper functions in the manner previously described with respect to the FIGS. 3–4 and FIGS. 5–6 embodiments.

Figure 9:
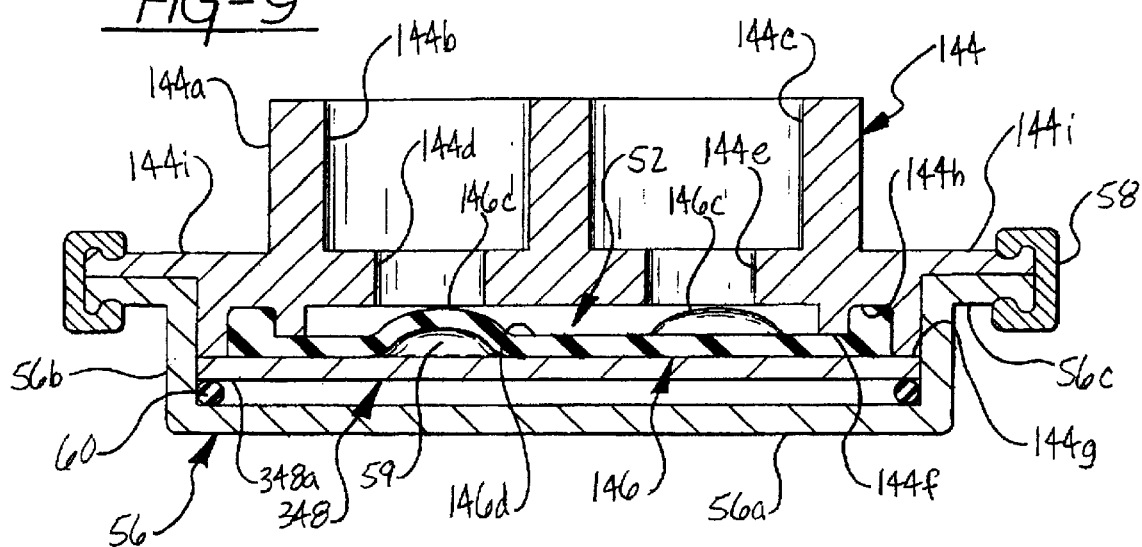
FIG. 9 is a cross-sectional view of a yet further modified damper design.
Figure 10A:
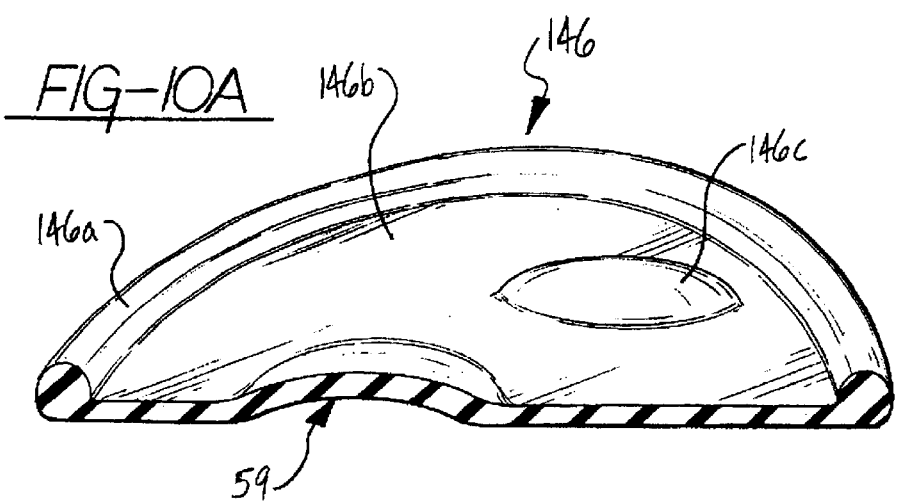
FIG. 10a is a fragmentary view of a diaphragm utilized in the damper of FIG. 9.

The damper of the FIGS. 9–10 embodiment includes a housing 144, an elastomeric diaphragm 146, a spring steel diaphragm 348, a cover member 56, and a clamping ring 58.

Housing 144 is generally similar to housing 44 with the exception that it further includes a flange portion 144i.

Elastomeric diaphragm 146 has a generally circular configuration and includes an upstanding annular flange portion 146a for receipt in groove 144h and a main body generally planar portion 146b for positioning beneath ports 144d, 144e.

Diaphragm 146 further includes a plurality of spaced bubble portions 146c upstanding from the upper face 146d of main body portion 146b and defining void areas 59 therebeneath between the elastomeric bubbles and the spring steel diaphragm. The spacing of bubbles 146 may be triangulated as shown or may assume other spatial configurations.

Spring steel diaphragm 348 has a circular plate configuration.

Cover 56 has a cup or dished configuration and includes a main body portion 56a, an annular upstanding flange portion 56b, and an annular lip portion 56c.

In the assembled relation of the damper of FIGS. 9–10, the annular flange portion 46a of the elastomeric diaphragm is positioned in groove 144h with the main body portion 46b of the diaphragm extending beneath the ports 144d, 144e and the bubbles 146c upstanding from the main body portion within the chamber 52; spring steel diaphragm 348 is positioned immediately beneath and contiguous with the elastomeric diaphragm with the peripheral edge 348a of the diaphragm positioned against the flange 144g of the housing; the annular flange portion 56b of cover 56 is positioned in surrounding relation to the flange portion 144g of the housing with the lip portion 56c of the cover positioned beneath the flange portion 148i of the housing and the main body portion 56a of the cover underlying spring steel diaphragm 348 in spaced relation with an O-ring 60 positioned between the main body portion 56a of the cover and the under face of the spring steel diaphragm to firmly press the diaphragm against the flange 144g of the housing; and clamping ring 58 is clamped over the flange 144i of the housing and the lip 56c of the cover to fixedly sandwich the housing, cover, spring steel flange, and elastomeric flange together.

In operation, low frequency vibrations experienced in the system are absorbed by elastomeric diaphragm 146 and specifically by elastic flattening of the bubbles 146c toward the upper face of the underlying steel diaphragm, and high frequency vibrations experienced in the system have the effect of elastically flattening the bubbles 146c against the upper face of the backup spring steel diaphragm and thereafter deflecting the composite elastomeric diaphragm/spring steel diaphragm to attenuate the high frequency vibrations in the system.

Figure 2:
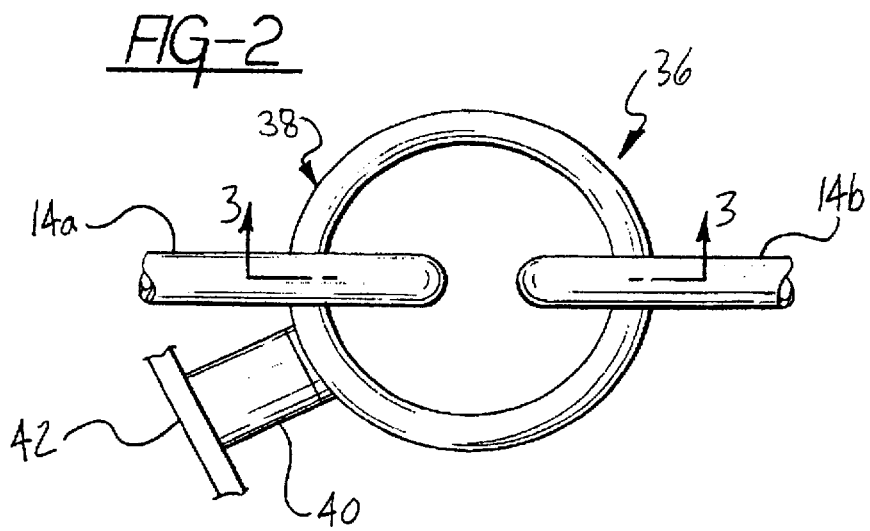
FIG. 2 is a fragmentary view of the invention damper looking in the direction of the arrow 2 in FIG. 1.
Figure 11:
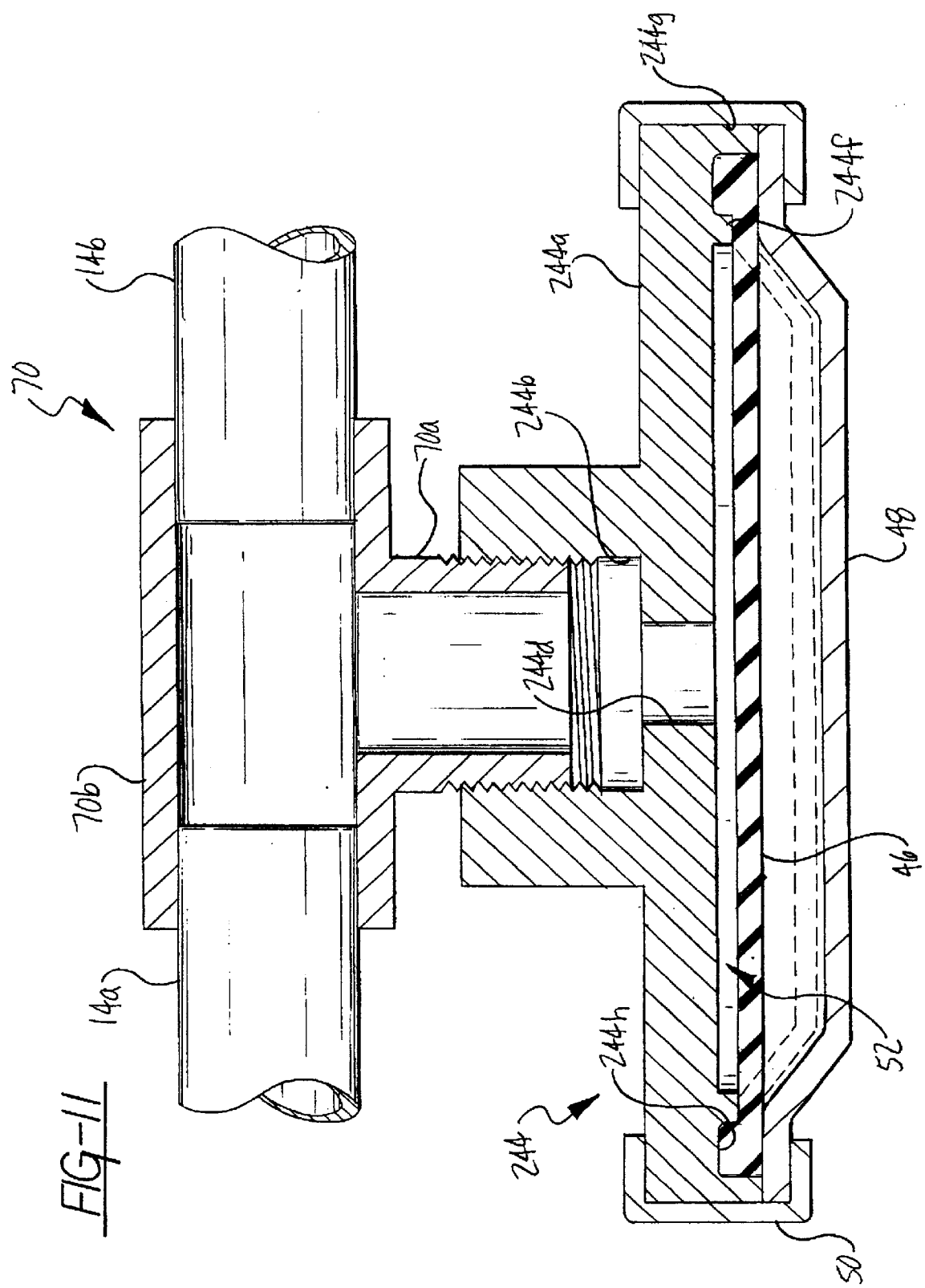
FIG. 11 is a cross-sectional view of a further modified damper design.

The damper embodiment of FIG. 11 is generally similar to the embodiment of FIGS. 2–4 with the exception that the separate inlet and outlet fittings of the housing of the FIG. 2–4 embodiment are replaced with a common central combined inlet/outlet fitting and a T-fitting 70 is provided to connect the damper to the conduit portions 14a, 14b. Specifically, housing 244 includes a main body portion 244a, a combination central inlet/outlet fitting 244b, a central port 244*d* communicating with fitting 244*b*, an annular rib 244*f*, and an annular flange or skirt 244*g* coacting with rib 244*f* to define an annular groove 244*h*.

T-fitting 70 includes a central stem portion 70*a* threadably received in fitting 244*c* and a top bar portion 70*b* for receiving conduit portions 14*a*, 14*b* at opposite ends thereof.

The damper embodiment of FIG. 11 further includes an elastomeric diaphragm 46, a steel diaphragm 48, and a clamp ring 50. Elements 46, 48, and 50 are identical to the like numbered elements in the FIGS. 2–4 embodiment and cooperate in the manner described with respect to the FIGS. 2–4 to dampen both low frequency and high frequency vibrations in the system.

The dual action damper of the invention will be seen to provide the important advantage of effectively attenuating both low frequency and high frequency vibrations encountered in the associated hydraulic fluid system.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A damper for provision in a hydraulic actuator system between a master cylinder and a slave cylinder of the system, said damper including:
   a housing including port means for connection in the system and defining a chamber in communication with the port means;
   an elastomeric diaphragm carried by said housing and having a thin planar configuration including upper and lower parallel planar faces, the elastomeric diaphragm extending across said chamber with the upper face thereof communicating with the port means so as to form a boundary wall of said system so that said elastomeric diaphragm deflects in response to low frequency vibrations transmitted through the hydraulic fluid in the system to effect damping of the low frequency vibrations; and
   a further planar diaphragm carried by said housing and defining a planar upper face positioned parallel to and proximate the lower face of the elastomeric diaphragm so as to form a backup for said elastomeric diaphragm so that said elastomeric diaphragm deforms against the further diaphragm in response to high frequency vibrations transmitted through the hydraulic fluid to seat the lower planar face of the elastomeric diaphragm against the upper planar face of the further diaphragm and cause deflection of the further diaphragm to effect damping of the high frequency vibrations.

2. A damper according to claim 1 wherein the elastomeric diaphragm is a rubber diaphragm.

3. A damper according to claim 1 wherein the port means comprises an inlet port and an outlet port.

4. A damper for provision in a hydraulic actuator system between a master cylinder and a slave cylinder of the system, said damper including a housing including port means for connection in the system and defining a chamber in communication with the port means and diaphragm means carried by said housing and extending across said chamber so as to form a boundary wall of said system so that the diaphragm means deflects in response to vibrations transmitted through the hydraulic fluid in the system to effect damping of the vibrations; characterized in that the damping means is a compound structure comprising:
   an elastomeric diaphragm having a thin planar configuration including upper and lower parallel planar faces, the elastomeric diaphragm extending across the chamber with the upper face thereof communicating with the port means so as to form the system boundary wall so that the elastomeric diaphragm deflects in response to low frequency vibrations transmitted through hydraulic fluid in the system to effect damping of the low frequency vibrations; and
   a further planar diaphragm defining a planar upper face positioned parallel to and proximate the lower face of the elastomeric diaphragm so as to form a backup for the elastomeric diaphragm so that the elastomeric diaphragm deforms against the further diaphragm in response to high frequency vibrations transmitted through the hydraulic fluid to seat a lower planar face of the elastomeric diaphragm against the upper planar face of the further diaphragm and cause deflection of the further diaphragm to effect damping of the high frequency vibrations.

5. A damper for provision in a hydraulic actuator system between a master cylinder and a slave cylinder of the system, said damper including:
   a housing including port means for connection in the system and defining a chamber in communication with the port means;
   a relatively flexible diaphragm having a thin planar configuration including upper and lower parallel planar faces, the flexible diaphragm being carried by said housing and extending across said chamber with the upper face thereof communicating with the port means so as to form a boundary wall of said system so that said relatively flexible diaphragm deflects in response to low frequency vibrations transmitted through hydraulic fluid in the system to effect damping of the low frequency vibrations; and
   a relatively stiff diaphragm defining a planar upper face carried by said housing and positioned parallel to and proximate the lower face of the relatively flexible diaphragm so as to form a backup for said relatively flexible diaphragm so that said relatively flexible diaphragm deforms against the relatively stiff diaphragm in response to high frequency vibrations transmitted through the hydraulic fluid to seat the lower planar face of the flexible diaphragm against the upper planar face of the stiff diaphragm and cause deflection of the relatively stiff diaphragm to effect damping of the high frequency vibrations.

6. A clutch hydraulic actuator system having a vibration damper provided in the system between a master cylinder and a slave cylinder of the system, said damper including:
   a housing including port means for connection in the system and defining a chamber in communication with the port means;
   an elastomeric diaphragm carried by said housing having a thin planar configuration including upper and lower parallel planar faces, the elastomeric diaphragm extending across said chamber with the upper face thereof communicating with the port means so as to form a boundary wall of said system so that said elastomeric diaphragm deflects in response to low frequency vibrations transmitted through hydraulic fluid in the system to effect damping of the low frequency vibrations; and a metallic diaphragm defining a planar upper face carried by said housing and positioned parallel to and proximate the lower face of the elastomeric diaphragm so as to form a backup for said elastomeric diaphragm so that said elastomeric diaphragm deforms against the metallic diaphragm in response to high frequency vibrations transmitted through the hydraulic fluid to seat the lower planar face of the elastomeric diaphragm against the upper planar face of the metallic diaphragm and cause deflection of the metallic diaphragm to effect damping of the high frequency vibrations.

7. A method of damping vibrations in a hydraulic actuator system including a master cylinder and a slave cylinder, the method comprising:

providing an elastomeric diaphragm having a thin planar configuration including upper and lower parallel planar faces;

positioning the elastomeric diaphragm in the system between the master cylinder and the slave cylinder with the upper face of the elastomeric diaphragm in fluid communication with hydraulic fluid in the system whereby said elastomeric diaphragm deflects in response to low frequency vibrations transmitted through hydraulic fluid in the system to effect damping of the low frequency vibrations;

providing a further diaphragm defining a planar upper face; and positioning the further diaphragm in the system with the upper face thereof generally parallel to and proximate the lower face of the elastomeric diaphragm so as to form a backup for the elastomeric diaphragm so that the elastomeric diaphragm deforms elastically against the further diaphragm in response to high frequency vibrations transmitted through the hydraulic fluid to seat that the planar lower face of the elastomeric diaphragm against the upper planar face of the further diaphragm and cause deflection of the further diaphragm to effect damping of the high frequency vibrations.

8. A method according to claim 7 wherein the elastomeric diaphragm is a rubber diaphragm.

9. A damper for provision in a hydraulic actuator system between a master cylinder and a slave cylinder of the system, said damper including:

a housing including port means for connection in the system and defining a chamber in communication with the port means;

a rubber diaphragm carried by said housing and extending across said chamber with one face thereof communicating with the port means so as to form a boundary wall of said system so that said rubber diaphragm deflects in response to low frequency vibrations transmitted through the hydraulic fluid in the system to effect damping of the low frequency vibrations; and a spring steel diaphragm carried by said housing and positioned parallel to and proximate the other face of the rubber diaphragm so as to form a backup for said rubber diaphragm so that said rubber diaphragm deforms against the spring steel diaphragm in response to high frequency vibrations transmitted through the hydraulic fluid to cause deflection of the spring steel diaphragm to effect damping of the high frequency vibrations.

10. A damper for provision in a hydraulic actuator system between a master cylinder and a slave cylinder of the system, said damper including:

a housing including port means for connection in the system and defining a chamber in communication with the port means;

an elastomeric diaphragm carried by said housing and extending across said chamber with one face thereof communicating with the port means so as to form a boundary wall of said system so that said elastomeric diaphragm deflects in response to low frequency vibrations transmitted through the hydraulic fluid in the system to effect damping of the low frequency vibrations; and a further diaphragm carried by said housing and positioned parallel to and proximate the other face of the elastomeric diaphragm so as to form a backup for said elastomeric diaphragm so that said elastomeric diaphragm deforms against the further diaphragm in response to high frequency vibrations transmitted through the hydraulic fluid to cause deflection of the further diaphragm to effect damping of the high frequency vibrations, the further diaphragm having a dished configuration including a peripheral portion engaging a peripheral portion of the other face of the elastomeric diaphragm and a central recessed portion positioned proximate but spaced from a central portion of the other face of the elastomeric diaphragm.

11. A damper according to claim 10 wherein the further diaphragm forms an outer wall of the damper.

12. A damper according to claim 11 wherein the damper further includes a clamping ring securing the cover member to the housing.

13. A damper for provision in a hydraulic actuator system between a master cylinder and a slave cylinder of the system, said damper including:

a housing including port means for connection in the system and defining a chamber in communication with the port means;

an elastomeric diaphragm carried by said housing and extending across said chamber with one face thereof communicating with the port means so as to form a boundary wall of said system so that said elastomeric diaphragm deflects in response to low frequency vibrations transmitted through the hydraulic fluid in the system to effect damping of the low frequency vibrations; and a further diaphragm carried by said housing and positioned parallel to and proximate the other face of the elastomeric diaphragm so as to form a backup for said elastomeric diaphragm so that said elastomeric diaphragm deforms against the further diaphragm in response to high frequency vibrations transmitted through the hydraulic fluid to cause deflection of the further diaphragm to effect damping of the high frequency vibrations, the elastomeric diaphragm including a generally planar main body portion positioned against one face of the further diaphragm and a plurality of spaced bubble portions upstanding from the one face of the elastomeric diaphragm and defining void areas therebeneath between the elastomeric diaphragm and the further diaphragm.

14. A damper according to claim 13 wherein the damper further includes a cover member fixed to the housing and including a main body portion positioned proximate to but spaced from the other face of the further diaphragm to define a void area therebetween to allow flexing of the further diaphragm.

15. A damper according to claim 14 wherein the damper further includes a clamping ring securing the cover member to the housing.

16. A damper according to claim 14 wherein the cover member further includes an annular flange portion embracing a portion of the housing to mount the cover member on the housing.

17. A damper according to claim 16 wherein the cover member further includes an annular lip on a free edge of the flange portion fixedly engaging the housing portion.

18. A damper for provision in a hydraulic actuator system between a master cylinder and a slave cylinder of the system, said damper including a housing including port means for connection in the system and defining a chamber in communication with the port means and diaphragm means carried by said housing and extending across said chamber so as to form a boundary wall of said system so that the diaphragm means deflect in response to vibrations transmitted through the hydraulic fluid in the system to effect damping of the vibrations; characterized in that the damping means is a compound structure comprising:

a rubber diaphragm extending across the chamber with one face thereof communicating with the port means so as to form the system boundary wall so that the rubber diaphragm deflects in response to low frequency vibrations transmitted through hydraulic fluid in the system to effect damping of the low frequency vibrations; and a spring steel diaphragm positioned parallel to and proximate the other face of the rubber diaphragm so as to form a backup for the rubber diaphragm so that the rubber diaphragm deforms against the spring steel diaphragm in response to high frequency vibrations transmitted through the hydraulic fluid to cause deflection of the spring steel diaphragm to effect damping of the high frequency vibrations.

19. A damper according to claim 18 wherein the port means comprises an inlet port and an outlet port.

20. A method of damping vibrations in a hydraulic actuator system including a master cylinder and a slave cylinder, the method comprising:

positioning a rubber diaphragm in the system between the master cylinder and the slave cylinder with one face of the rubber diaphragm in fluid communication with hydraulic fluid in the system whereby said rubber diaphragm may deflect in response to low frequency vibrations transmitted through hydraulic fluid in the system to effect damping of the low frequency vibrations; and positioning a spring steel diaphragm in the system generally parallel to and proximate the other face of the rubber diaphragm so as to form a backup for the rubber diaphragm so that the rubber diaphragm may deform elastically against the spring steel diaphragm in response to high frequency vibrations transmitted through the hydraulic fluid to cause deflection of the spring steel diaphragm to effect damping of the high frequency vibrations.

* * * * *